United States Patent
Crowder

[15] 3,683,718
[45] Aug. 15, 1972

[54] INSTANT ACTION BRAKE FOR VEHICLES

[72] Inventor: Wyly Kenneth Crowder, 3255 Windcroft Dr., Pontiac, Mich. 48054

[22] Filed: May 22, 1970

[21] Appl. No.: 39,700

[52] U.S. Cl. ................................................74/562.5
[51] Int. Cl. .............................................G05g 1/16
[58] Field of Search.................74/512, 562.5, 562

[56] References Cited

UNITED STATES PATENTS

| | | | |
|---|---|---|---|
| 1,261,425 | 4/1918 | Murphy | 74/562.5 |
| 2,890,597 | 6/1959 | Allgaier | 74/562.5 |
| 1,671,169 | 5/1928 | Swain | 74/562 X |

FOREIGN PATENTS OR APPLICATIONS 788,004   12/1957   Great Britain............74/562.5

Primary Examiner—William F. O'Dea
Assistant Examiner—F. D. Shoemaker
Attorney—James T. Barr

[57] ABSTRACT

An auxiliary brake apparatus whereby operator control of a vehicle is continuously maintained through a foot engaged pivotal pedal directly associated with cam means to obviate reaction time in cases of emergency to stop the vehicle. The cam means includes a quick response cam surface for fast engagement with the vehicle brake mechanism as well as a slower response can surface to prevent wear on the brake mechanism.

4 Claims, 6 Drawing Figures

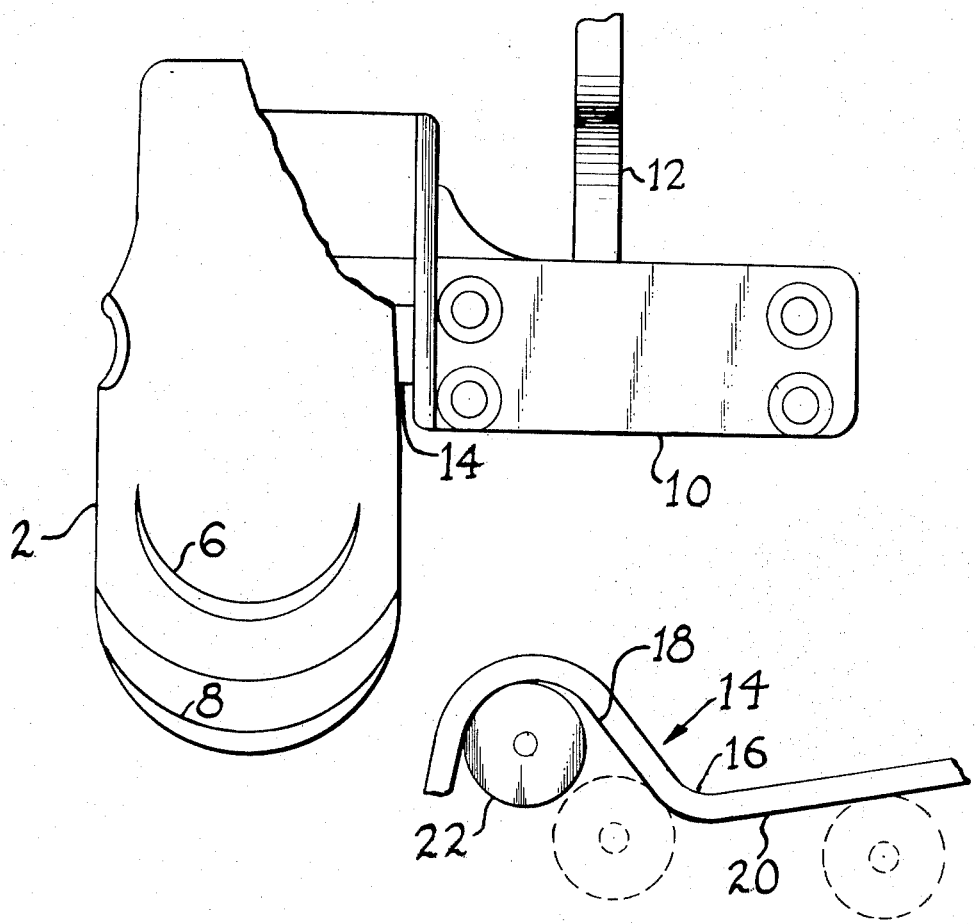

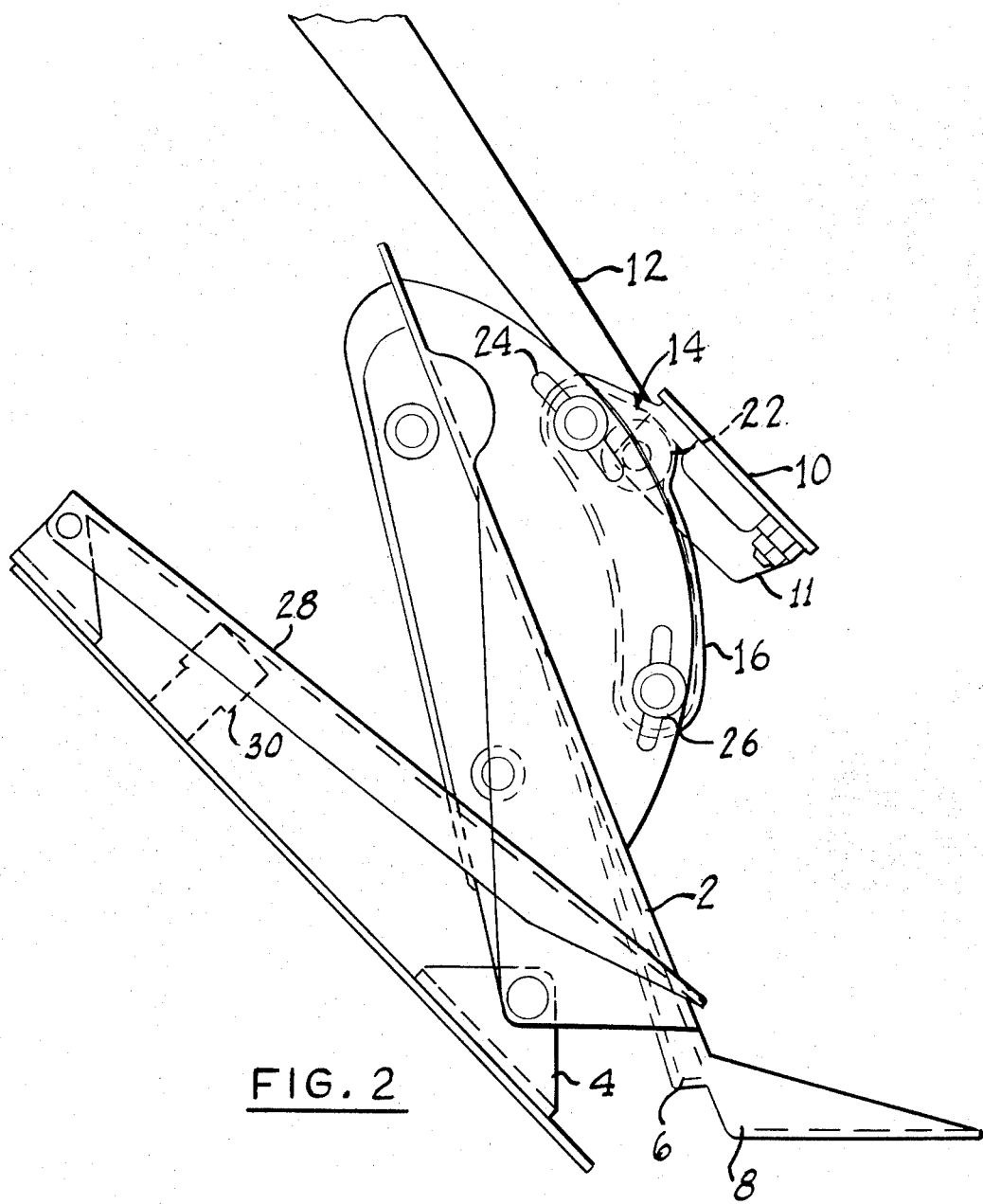

INVENTER.
WYLY KENNETH CROWDER
BY
James T. Back, Atty.

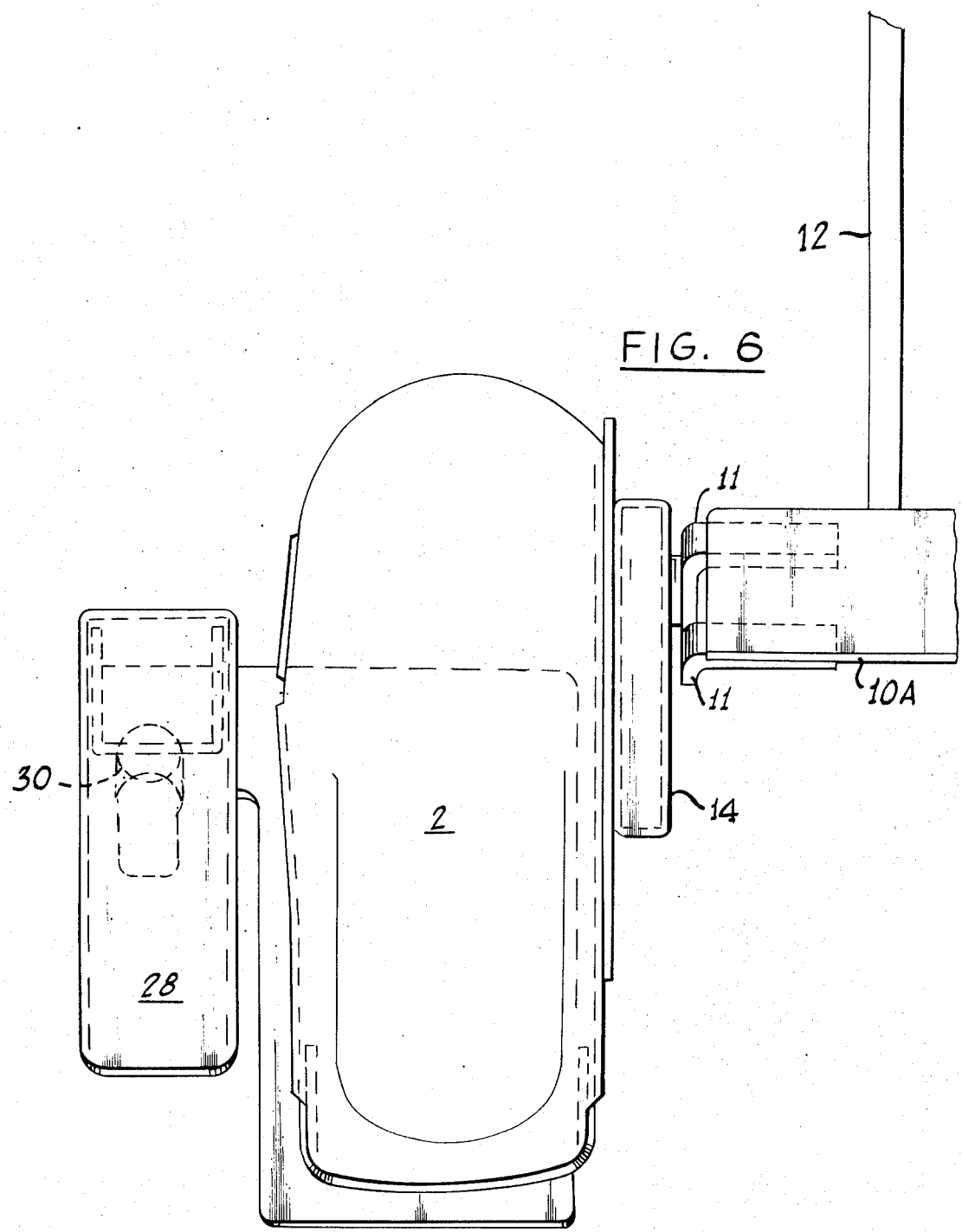

INSTANT ACTION BRAKE FOR VEHICLES

SUMMARY

This invention relates to a mechanical device which interconnects or is contiguous with the operator in that it provides a means whereby the braking mechanism of a vehicle becomes an integral part of the volitional muscle system of the operator.

Under ordinary circumstances the braking apparatus of a vehicle is actuated by lifting the foot off the accelerator (or off the floor if the left foot is used) and placing it on the brake. Under emergency conditions, the fastest reaction time for a normal individual (by this is meant someone who is not too old or handicapped so as to retard reaction time) requires approximately 0.33 of a second; at 45 m.p.h.: 0.33 of a second is about 40 feet travel distance of the vehicle.

Nervous messages of people are accompanied by brief electrical charges, known as action potentials. When a sense organ is stimulated, or when the central nervous system issues an order to a muscle (such as applying the brake), electrical impulses carry this information. The action potentials which carry information along the nerve fibers last about 1/1,000 sec. and travel at speeds of 100 m. per second (100 m. per second is equal to 224 m.p.h.). This means a reaction time gradient is created. The reaction time gradient varies from person to person (old to young or healthy to unhealthy) as do environmental conditions also effect the gradient. The crucial point is, the reaction time gradient could mean the difference between life and death.

Therefore, the primary object of this invention is to eliminate the reaction time gradient by providing a means whereby body movement is minimized to a simple pivot effort. To accomplish this object, the left foot of the operator rests continually on the brake apparatus which is applied by pivoting the foot forward, or by pressing with the toe instead of the entire muscular system of the operator. This is accomplished by efficient use of leverage whereby the left foot acquires complete and absolute control over braking merely by rocking forward.

This means greater control because without the present invention the operator needed one foot firmly planted to feel and have absolute control. The left foot was rested firmly on the floor while the right foot was lifted off the throttle and placed on the brake; this done to maintain body balance. A panic action, which might eventuate the loss of control, would actually tend to release the brake if no pivot effort is applied. This also eliminates the tendency to ride the brake but at the same time means complete control with the left foot merely pivoting forward to apply braking, at least a car length sooner than the right foot could when the vehicle is traveling at 40 m.p.h.

While the principles of the present invention are applicable to virtually any automobile, it is to be understood that the descriptions and drawings do not limit the scope of the present invention from that expressed by the claims hereunto appended.

The present invention will be readily understood by the following description of certain embodiments in conjunction with the following drawings in which:

FIG. 1 is a top plan view of the apparatus as viewed from an operator's position;

FIG. 2 is a side view of the apparatus;

FIG. 3 is a side view of a portion of FIG. 2 showing the cam and cam follower in various positions;

FIG. 6 is a top plan view of a further modification of the invention.

Figure 4:
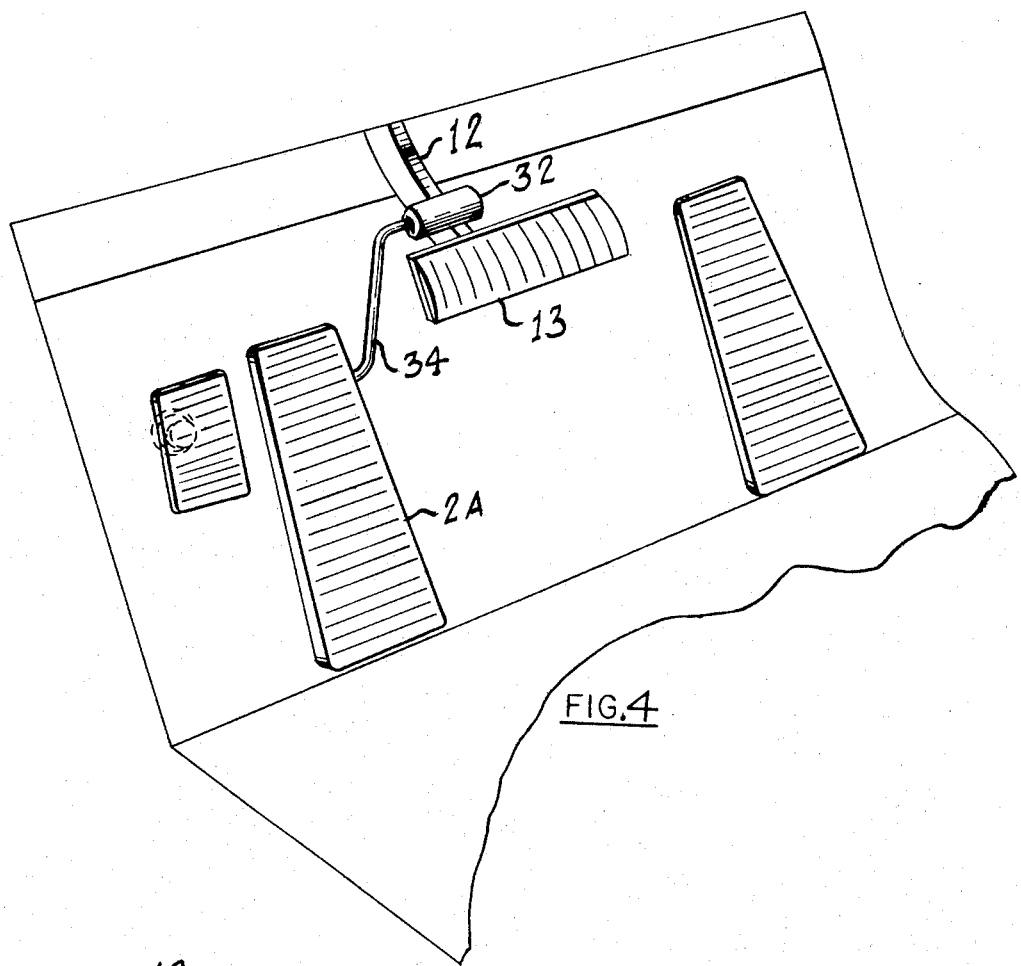
FIG. 4 is a perspective view of a modified form of the invention.

Referring now to FIG. 1, the instant action brake apparatus is shown in a top plan view as viewed by the operator of a vehicle from the driver's seat in a normal driving position. The foot retaining member 2 is pivotally mounted on a bracket 4 (FIG. 2) and provides a plurality of heel recesses 6 & 8, to accomodate feet of different sizes.

A flat member 10 is secured by clamps, rivets or other suitable means to the brake pedal of the vehicle for direct operation of the braking mechanism via the lever 12.

Interposed between member 2 and member 10 is cam means 14 which is more particularly shown in FIGS. 2 & 3. The cam means 14 includes a cam 16 mounted on member 2 and having a quick response cam surface 18 and a relatively slow response cam surface 20. A cam follower 22 is mounted on member 10 and adapted for rotary movement while riding on the cam surfaces 18 and 20.

It should be noted in FIG. 2 that bracket 4 is mounted on the vehicle floor at a position of angularility with respect to the horizontal floor portion but in proximity to a comfortable position for the foot while permitting functional access to the conventional brake mechanism. This location of the bracket 4 will vary slightly from one vehicle to another and will depend upon the proper choice by the installer to obtain both the comfort and functional aspects of this invention.

The cam 16, which forms with the cam follower 22 the cam means 14, is preferably mounted on the foot retaining means 2 and is adjustable by adjusting means 24 and 26, as shown in FIG 2 or may be bent in a vise to change the relative angularity of cam surfaces 18 and 20 to compensate for different leverage situations encountered in different makes of motor vehicles.

Referring now to FIGS. 2 and 6 there is shown an optional feature which incorporates an easy access pivot member 28 attached to the member 2 and adapted for engagement with a dimmer switch 30 which is a conventional part of most vehicles.

Figure 5:
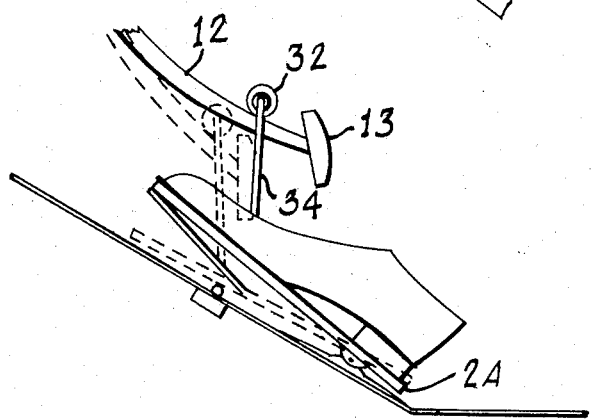
FIG. 5 is a side view of the apparatus of FIG. 4.

In FIGS. 4 and 5 a modified form of the invention is shown. The ordinary brake 13 and lever 12 are engaged by a cam member 32 which is rotatably mounted on a pivot lever 34. The lever 34 is pivotally fastened to a foot retaining member 2A similar to member 2 of the preferred embodiment shown in FIGS. 1,2 and 3.

In FIGS. 2 and 6 a different form of mounting the apparatus is shown. The conventional brake pedal 10A is utilized with brackets 11 being secured to the underneath side instead of the plate 10 which covers the top side of said brake pedal.

Thus it will be apparent that an operator of a motor vehicle is at all times in control of the braking system by merely and comfortably resting his left foot in one of the heel recesses 6 and 8 while traveling. In cases of emergency only a slight rocking of the foot forwardly, and not the physical exertion of the whole body as in conventional braking systems, will engage the brake lever 12 at the quick response cam surface 18 to rapidly depress the lever 12, further action being gradual along the slow cam surface 20. This action results in instantaneous braking action with minimum physical effort and minimum time expended.

It is also apparent that some modifications of this invention are possible and it is intended that no limitations are extended except as expressed in the appended claims.

What is claimed is:

1. In auxiliary brake apparatus for a vehicle to provide continuous braking control by an operator:
   a. a foot retaining member pivotally mounted in juxtaposition to the left foot of the operator;
   b. a contact member contiguously associated with the brake pedal of said vehicle and having a rotatable cam follower extending towards said foot retaining member; and
   c. cam means adjustably connected to said foot retaining member and having an arcuate surface for initial engagement with said cam follower to provide quick response therebetween upon pivotal movement of said foot retaining member in response to pressure by said left foot of said operator, and having a relatively flat surface for subsequent engagement with said cam follower to provide slow response to reduce braking effort.

2. In the apparatus of claim 1, wherein said foot retaining member includes a plurality of heel recesses for accomodating feet of different sizes.

3. In auxiliary brake apparatus for continuous use by an operator of a vehicle:
   a. a brake pedal member in contiguous contact with the brake mechanism of said vehicle;
   b. a cam follower on said brake pedal member;
   c. a pivotally mounted foot retaining member for comfortably accomodating the left foot of said operator; and
   d. a cam member adjustably mounted on said foot retaining member and having a curved portion in contact with said cam follower upon initial engagement therebetween to provide quick braking response upon forward pivotal movement of said foot retaining member, and having a gradual relatively flat portion in contact with said cam follower for slower braking response thereafter.

4. In the apparatus of claim 3 wherein said foot retaining member includes a plurality of heel recesses for accomodating feet of different sizes.

* * * * *